US008608129B2

(12) United States Patent
McArdle

(10) Patent No.: US 8,608,129 B2
(45) Date of Patent: Dec. 17, 2013

(54) PRECISION DISPENSE VALVE

(75) Inventor: Eamon Joseph McArdle, Bergamo (IT)

(73) Assignee: Willcox Investments S.A., Luxembourg (LU)

( * ) Notice: Subject to any disclaimer, the term of this patent is extended or adjusted under 35 U.S.C. 154(b) by 651 days.

(21) Appl. No.: 12/483,019

(22) Filed: Jun. 11, 2009

(65) Prior Publication Data

US 2009/0309058 A1     Dec. 17, 2009

(30) Foreign Application Priority Data

Jun. 13, 2008 (EP) ..................... 08158256

(51) Int. Cl.
*F16K 5/00* (2006.01)

(52) U.S. Cl.
USPC .................... 251/310; 251/129.11

(58) Field of Classification Search
USPC ........ 251/129.05, 129.11, 208, 209, 309–311
See application file for complete search history.

(56) References Cited

U.S. PATENT DOCUMENTS

| | | | | | |
|---|---|---|---|---|---|
| 1,310,980 | A | * | 7/1919 | Conn | 251/155 |
| 2,078,402 | A | * | 4/1937 | McDonough et al. | 137/583 |
| 2,529,412 | A | * | 11/1950 | Parker | 251/174 |
| 3,038,695 | A | * | 6/1962 | Wildern | 251/181 |
| 3,325,143 | A | * | 6/1967 | Phillips | 251/311 |
| 3,360,236 | A | * | 12/1967 | Hulslander | 251/184 |
| 3,370,335 | A | * | 2/1968 | Freed | 29/890.126 |
| 3,526,136 | A | * | 9/1970 | Caldwell, Sr. et al. | 73/756 |
| 3,889,923 | A | * | 6/1975 | Saville et al. | 251/170 |
| 3,913,886 | A | * | 10/1975 | Di Cicco | 251/215 |
| 4,554,946 | A | * | 11/1985 | Poole | 137/384.2 |
| 5,123,449 | A | * | 6/1992 | Nowicki | 137/625.11 |
| 5,165,961 | A | * | 11/1992 | Freeman | 427/207.1 |
| 5,330,331 | A | * | 7/1994 | Doede | 417/519 |
| 5,784,863 | A | * | 7/1998 | Davis | 53/551 |
| 5,868,165 | A | * | 2/1999 | Tranovich | 137/625.23 |
| 6,808,162 | B2 | * | 10/2004 | Tranovich et al. | 251/209 |
| 6,824,120 | B2 | * | 11/2004 | Furuta et al. | 251/355 |
| 6,863,257 | B2 | * | 3/2005 | Home | 251/209 |
| 7,546,851 | B2 | * | 6/2009 | Wang | 137/625.47 |
| 7,967,005 | B2 | * | 6/2011 | Parrish | 126/42 |
| 2003/0052292 | A1 | | 3/2003 | Tranovich et al. | |
| 2007/0261745 | A1 | * | 11/2007 | Hollis | 137/625.47 |

FOREIGN PATENT DOCUMENTS

GB    2 112 115 A    7/1983
WO   WO 2005/100188 A2   10/2005

* cited by examiner

*Primary Examiner* — John K Fristoe, Jr.
*Assistant Examiner* — Matthew W Jellett
(74) *Attorney, Agent, or Firm* — Dickstein Shapiro LLP

(57) ABSTRACT

A fluid dosing valve assembly for dispensing a volumetric amount of a fluid in precise and repeatable amounts, particularly for dosing small amounts. The fluid dosing valve assembly includes a valve body with a fluid path, and a stem element for opening and closing the fluid path by rotation, the rotation being performed from a first closing position to an opening position and from the opening position to a second closing position, with rotation angles between the first closing position and the opening position and between the opening position and the second closing position that allow the opening cycle to be performed at constant rotational speed.

20 Claims, 3 Drawing Sheets

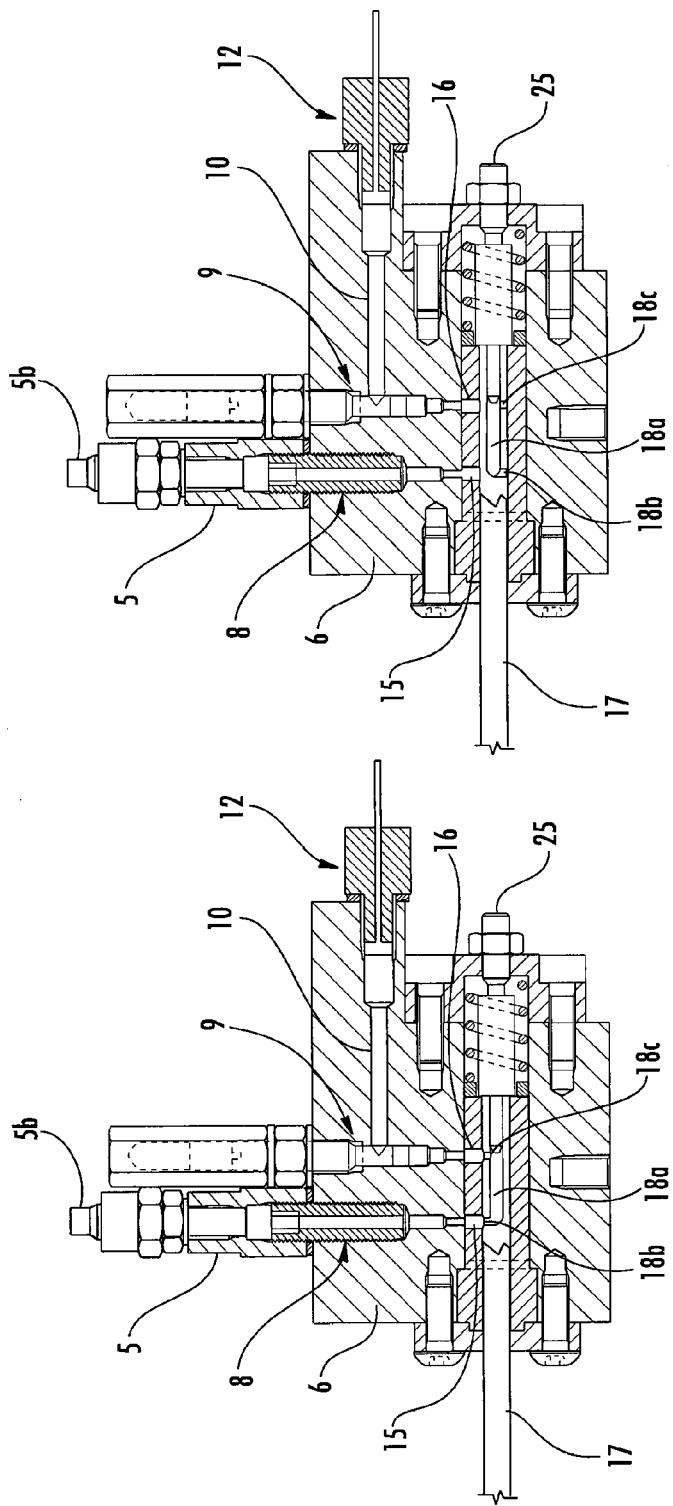

PRECISION DISPENSE VALVE

FIELD OF THE INVENTION

The present invention relates to a device for dispensing a defined amount of a fluid in precise and repeatable doses, particularly for dosing small amounts of such a fluid. The intended use of the present invention is for integration into automatic production, process and assembly equipment, but the invention can also be used for single position manual applications.

BACKGROUND ART

Valve assemblies for dispensing or dosing small amounts of a fluid are known. However, high precision repeatable dispensing is hard to be achieved, due to the structural design of the valve as well as operational parameters of the fluid that may change during use.

In particular, four different variables can affect a precise and constant operation of a valve, these variables being:

Time of opening of the valve: this parameter depends on the valve design and becomes really critical when very small amounts of dispensed fluid are required, which means very short opening time of the valve;

Diameters of the inlet and outlet orifices of the valve: if such diameters are very small, it is important to machine such orifices with as high precision as possible;

Viscosity of the fluid being dispensed, which determines the ability of the fluid to flow through the fluid path and therefore the amount of fluid dispensed during the cycle of valve opening: depending on the nature of the fluid, its viscosity can vary with the ambient temperature;

Pressure of the fluid, which determines the force and resultant speed of the fluid through the fluid path: non constant pressure of the fluid being dispensed means variable amounts of fluid passing through the valve orifices.

The above parameters are particularly critical when the fluid is a viscous fluid, such as a glue or a liquid adhesive.

SUMMARY OF THE INVENTION

The problem faced by the present invention is to provide a valve assembly that allows a precise and repeatable dispensing of even small amounts of a fluid, particularly of a viscous fluid.

This problem is solved by a valve and a valve assembly such as outlined in the annexed claims, whose wording is integral part of the present description.

Further features and advantages of the present invention will be better understood from the description of a preferred embodiment, which is given below by way of a non-limiting illustration.

BRIEF DESCRIPTION OF THE DRAWINGS

FIGS. 3A and 3B are side sectional views of the valve of FIG. 2 in different operational conditions.

DETAILED DESCRIPTION OF THE INVENTION

Figure 1:
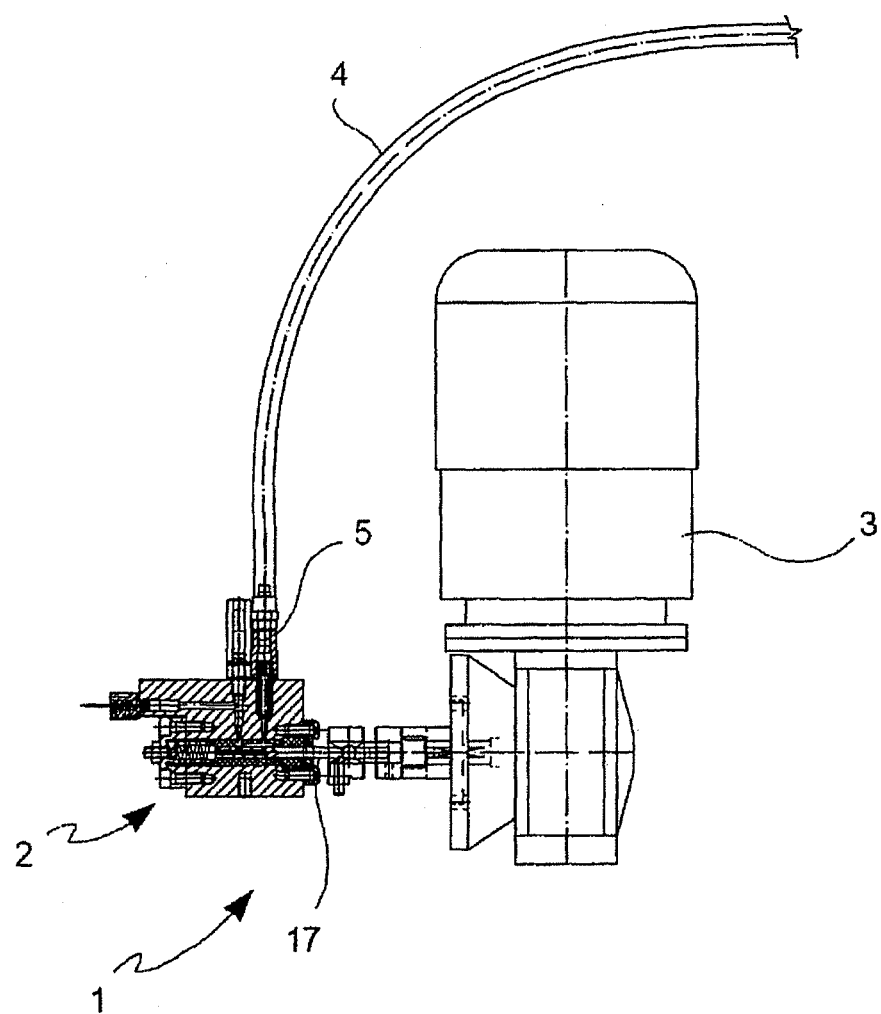
FIG. 1 is a side sectional view of the valve assembly of the invention.
Figure 2:
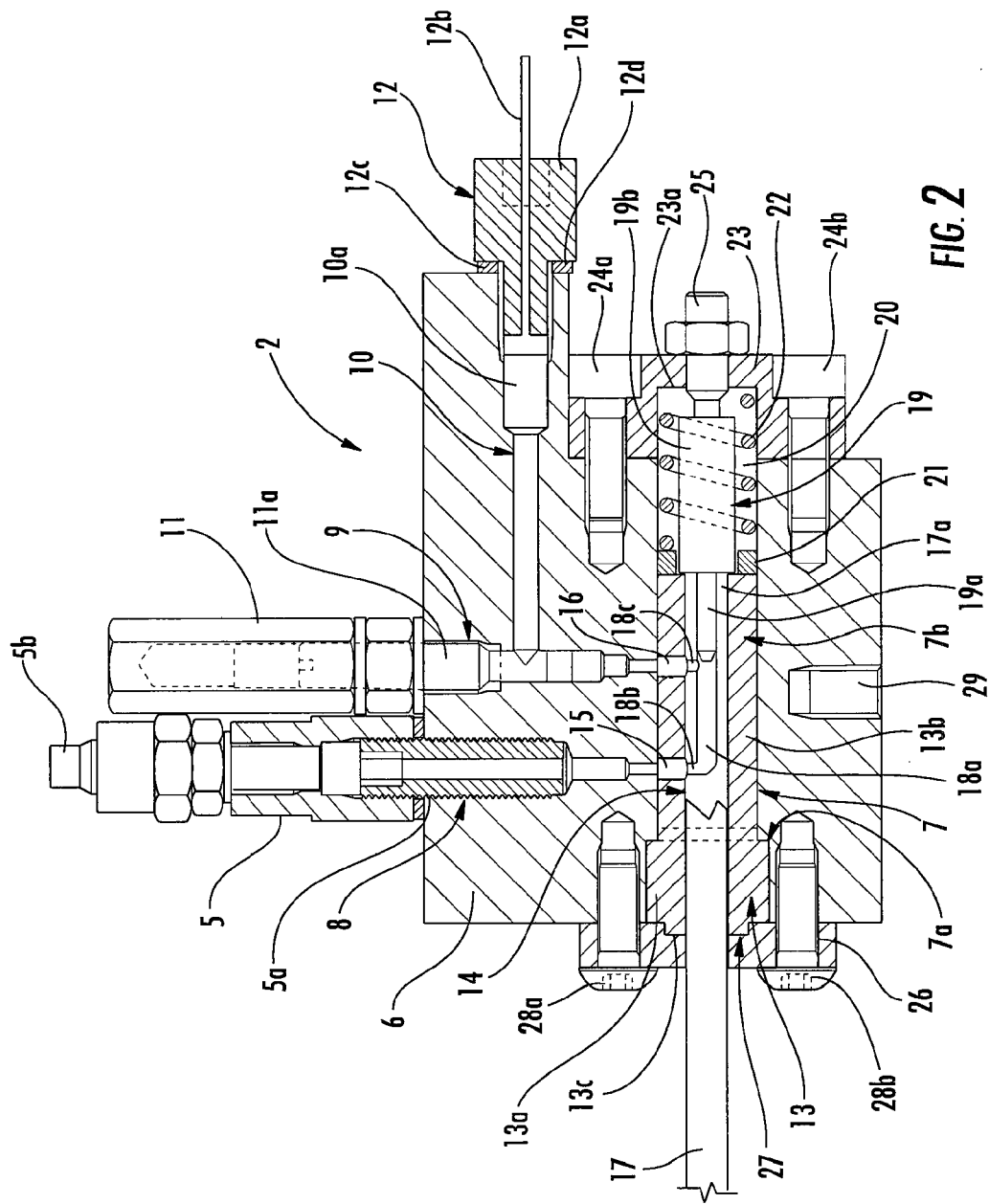
FIG. 2 is a side sectional view of the valve of FIG. 1.

With reference to the figures, the valve assembly of the invention, identified with the numeral 1, comprises valve means 2 and motor means 3. A pipe 4, or other suitable connecting means, puts into flow communication inlet means 5 for the valve means 2 with a fluid reservoir (not shown).

The fluid reservoir may comprise thermostatting means to keep the fluid at a constant temperature, as well as pumping means to deliver the fluid at a given constant pressure. A given pressure gap ($\Delta P$) between the fluid in the reservoir and the valve means 2 can be achieved for example by increasing the gauge pressure of the fluid reservoir or increasing the head pressure on the fluid by changing the height of the reservoir in relation to the intended location of the valve means 2.

The motor means 3 are preferably a brushless motor with its relative driver.

The valve means 2 comprise a valve body 6 that houses a suitable channel network identifying a fluid path and suitable seats for the valve particulars. The valve body 6, that can advantageously be built in stainless steel, is preferably made of one piece that is machined to obtain the channel network.

The channel network comprises a main duct 7 that longitudinally passes the whole valve body 6 and is designed to house the valve stem; inlet duct 8 and outlet duct 9—substantially perpendicular to and opening into the main duct 7—that house the inlet means 5 and closure means 11, respectively; a dispensing duct 10, originating substantially perpendicularly from the outlet duct 9 and housing dispensing means 12 for the fluid.

The inlet duct 8 and the outlet duct 9 are substantially parallel and are positioned side by side.

The inlet duct 8 comprises an external portion of enlarged diameter, in order to receive the inlet means 5. The inlet means 5 comprise a nozzle 5a and a connecting portion 5b for fitting into the pipe 4. The nozzle 5a can have a threaded external surface, in order to screw it into the corresponding portion of the inlet duct 8, that in this case must be threaded too.

The outlet duct 9 has also an external portion of enlarged diameter that receives a fitting end 11a of the closure means 11. The fitting end 11a has a length equal to or less than the portion of the outlet duct 9 comprised between the intersection with the dispensing duct 10 and the exterior, so that the fluid path is not obstructed, but it can almost become obstructed to dispense real small amounts of fluid.

The external surface of the fitting end 11a of the closure means 11 as well as the corresponding surface portion of the outlet duct 9 can be threaded, for screw fixing.

The dispensing duct 10 comprises an external portion 10a leading outside, wherein the dispensing means 12 for the fluid are fitted (for example, by screw fixing). The dispensing means 12 comprise a supporting element 12a having a through hole that houses a cannula 12b working as a nozzle for the fluid to be dispensed. The supporting element 12a is T-shaped, the larger part being positioned outside the portion 10a of the dispensing duct 10, so that the resulting shoulder 12c hosts a seal element 12d that abuts against the valve body 6, in order to avoid leakage of the fluid.

The dispensing means 12 described herein are designed for dispensing very small amounts of a fluid, but it should be understood that any other suitable dispensing means or nozzle can also be used.

The main duct 7 comprises a portion 7a of enlarged diameter in proximity of a first end of the duct, thus forming a shoulder with the remaining portion 7b.

A seal element 13 is designed to be fitted inside the main duct 7. To this end, the seal element 13 comprises a first portion 13a, substantially fitting the portion 7a of the main duct 7, and a second portion 13b having an external diameter substantially equal to the inner diameter of the portion 7b of the main duct 7, but a lower length, so that the seal element 13 does not extend to the opposite end of the main duct 7. The seal element 13 also comprises a third portion 13c of smaller diameter that protrudes from the first end of the main duct 7.

The seal element 13 is tubular, so that it has a through hole 14 of circular section which is coaxial with respect to the longitudinal axis of the seal element 13. Two openings, an inlet opening 15 and an outlet opening 16, are made in the second portion 13b of the seal element 13 to put into communication the through hole 14 with the exterior of the seal. The position in which these two openings 15, 16 are made is such that they are aligned with the inlet duct 8 and the outlet duct 9, respectively, when the seal element 13 is fitted into the main duct 7.

The seal element 13 is preferably made of a material that avoids any leakage to occur and on the same time has a low friction coefficient, such as a plastic material like teflon®, which is compatible with FDA regulations for medical and pharmaceutical applications. The seal element 13 is assembled to the valve body 6 by force fitting, as there is intentionally an interference between the outside diameter of the seal element 13 and the internal diameter of the main duct 7 to achieve optimal sealing properties.

The through hole 14 of the seal element 13 houses coaxially a stem element 17 that is operatively connected with the motor means 3, of which might form the shaft itself. The stem element 17 is fitted for rotation inside the through hole 14, without leaving any gap between the inner surface of the seal element 13 and the outer surface of the stem element 17, so that no leakage can occur.

The terminal portion 17a of the stem element 17, that is positioned at the level of the end of the seal element 13, comprises a coaxial duct 18a, an inlet orifice 18b and an outlet orifice 18c, these latter being positioned in alignment with the inlet opening 15 and the outlet opening 16 of the seal element 13, respectively, when the stem element 17 is in its operative position.

The free end of the main duct 7 houses plug means 19 apt to close the open end of the coaxial duct 18a of the stem element 17. The plug means 19 comprise a spindle 19a, apt to be inserted in the coaxial duct 18a up to the level of the outlet orifice 18c, without interfering with it, and an external body 19b of larger diameter. The external body 19b protrudes from the open end of the main duct 7 and has a diameter smaller than the internal diameter of the main duct 7, so that a gap 20 is created.

Around the external body 19b of the plug means 19 there is positioned a ring 21, preferably made of stainless steel, which is in abutment with the head surface of the seal element 13. Spring means 22 are also positioned around the external body 19b. These spring means 22 protrude outside the main duct 7 from one side and abut against the ring 21 at the other side.

An axial retaining plate 23 is removably fixed on the valve body 6, in abutment with the spring means 22. For this purpose, the plate 23 comprises a recessed portion 23a on the abutting surface, wherein the projecting head of both the plug means 19 and the spring means 22 can be accommodated. Suitable fixing means 24a, 24b, such as bolts, provide locking of the plate 23 against the valve body 6. A through hole, passing the surface of the recessed portion 23a of the axial retaining plate 23, houses a bolt 25 insisting coaxially against the external body 19b of the plug means 19, in order to press the plug means 19 against the seal element 13. In such a way, the axial position of the seal element 13 is set and the loads across the seal element 13 itself are suitably distributed.

A radial retaining plate 26 is removably fixed on the valve body 6 at the opposite side of the main duct 7, with respect to the axial retaining plate 23. In this case too, suitable fixing means 28a, 28b, such as bolts, provide locking of the plate 26 against the valve body 6. The surface of the radial retaining plate 26 facing toward the valve body 6 comprises a recessed portion 27, complementary in shape with the protruding third portion 13c of the seal element 13, with which it matches. In such a way the radial positioning of the seal element 13 is guaranteed.

A preferably threaded, fixing seat 29 is provided on the valve body 6, in order to fix it to the framework of a machine or device to which the present valve assembly 1 should be operatively connected.

The operation of the valve assembly 1 according to the present invention will be now described.

The fluid path is comprised of: the inlet duct 8, the inlet opening 15 and the inlet orifice 18b, in alignment with each other in order to define an inlet line; the coaxial duct 18a, substantially perpendicular to the inlet line; the outlet orifice 18c, the outlet opening 16 and the outlet duct 9, in alignment with each other in order to define an outlet line that is substantially perpendicular to the coaxial duct 18a; the dispensing duct 10 that is substantially perpendicular to the outlet duct 9. The fluid path so defined, therefore, is accomplished with linear segments joined by 900 angles and is designed with a smooth profile without corners, to eliminate the possibility of "dead spaces" or turbulent fluid path flow zones.

The stem element 17 is put into rotation by the motor means 3 and can move between a closing position, shown in FIG. 3B, and an opening position, as shown in FIG. 3A. In the closing position, the orifices 18b, 18c of the stem element 17 are not aligned with the openings 15, 16 and the inlet and outlet ducts 8, 9, so that the valve is in closed condition. Once, upon rotation of the stem element 17, the inlet and outlet orifices 18b, 18c come into fluid communication with the openings 15, 16 and the ducts 8, 9, the fluid path is recreated and the valve is in open condition.

Only the FIG. 3B represents the static condition of the valve which is defined as valve closed. The FIG. 3A is a dynamic condition because the dosing does not need to stop the rotation of the stem element 17 in front of the orifices 18b, 18c.

The amount of dispensed fluid depends on several factors, as said above, namely the pressure of the fluid, its viscosity, the size of the orifices 18b, 18c and the time of opening of the fluid path. While the size of the orifices is determined when the valve is designed and pressure and viscosity of the fluid is mainly governed by appropriate pressure and temperature control of the fluid in the reservoir and/or along the line, the only parameter that directly depends on the operating condition of the valve is the time of opening of the fluid path. As the stem element 17 driven by the motor means 3 normally has a motion profile that comprises an acceleration step, a step at constant speed and a deceleration step, for a precise dosing of a small amount of a fluid it is essential that the acceleration and the deceleration steps does not intervene during the opening time of the valve.

The valve assembly 1 of the invention is designed in such a way that it is possible to set a closing position of the stem element 17 that is far enough from the opening position in order to operate the acceleration and the deceleration steps when the valve is still in closed condition. Thus, when the orifices 18b, 18c come into fluid communication with the openings 15, 16 and the inlet and outlet ducts 8, 9 and during the whole opening cycle of the valve, the stem element 17 rotates at constant speed. In such a way, a precise and repeatable dosing of the fluid is guaranteed.

In one embodiment, the closing position is offset of 180° with respect to the opening position, so that the stem element 17 must rotate of approximately 180° before opening the fluid path and must then rotate of approximately 180° before returning to the initial closing position, by making an overall about 360° rotation. The term "about 360° " means 360° ± tolerances, for example 360°±20°. To the inventive purpose, it may however be possible to set a smaller angle of rotation between a first closing position and the opening position and between the opening position and a second closing position, for example 150°, with an overall rotation less than 360° (in the example, 300°) without departing from the scope of the invention, as the acceleration and deceleration steps are still excluded. In this case it is not necessary that the first angle between the first closing position and the opening position has the same extent that the second angle between the opening position and the second closing position, with the only proviso that the opening cycle is to be performed at constant rotational speed.

In a preferred embodiment, the rotation angles between a closing position and the opening position are comprised between 30° and 180°.

With the term "opening cycle" in the present invention it is intended the rotation movement of the stem element 17 during which the fluid path is open.

The opening time of the fluid path can thus be modulated precisely by changing the rotational speed of the stem element 17.

The valve assembly 1 of the invention thus solves the problems underlined at the beginning of the present description.

The fluid path is designed to avoid dead spaces and turbulent flow and is non-linear, so that undesirable pressure gaps are avoided.

Moreover, no axial (forward and backward) movements of the fluid are allowed, since the dispensing is provided by a cut of the fluid path. The fluid amount which is cut off from the fluid path represents the dosing.

The rotation movement of the valve stem during the opening cycle of the valve is performed at constant speed, so that precise and repeatable dosing is assured.

The construction of the valve body 6 as a one piece avoids that leakage can occur. This has been achieved by a double-seal design.

The inventive valve assembly 1 is of simple construction, as the channel network can be obtained by precisely machining, so that the costs are kept low.

It will be appreciated that only a particular embodiment of the present invention has been described herein, to which those skilled in the art will be able to make any and all modifications necessary for its adjustment to specific applications, without however departing from the scope of protection of the present invention as defined in the annexed claims.

What is claimed is:

1. Fluid dosing valve assembly comprising:
a valve body wherein a fluid path is defined,
a stem element for opening and closing the said fluid path by means of a rotation around the said stem element axis,
wherein the rotation is performed by an opening cycle that starts from a first closing position, to an opening position and from the opening position to a second closing position, with rotation angles between the first closing position and the opening position and between the opening position and the second closing position that allow the opening cycle to be performed at constant rotational speed,
wherein the stem element is driven by motor means with a motion profile that comprises an acceleration step, a step at constant speed and a deceleration step, wherein the acceleration and the deceleration steps do not intervene with the opening cycle of the valve.

2. Fluid dosing value assembly according to claim 1, wherein the rotation angles are comprised between 30° and 180°.

3. Fluid dosing valve assembly according to claim 1, wherein the first closing position and the second closing position are in the same positions and the rotation around the stem element axis is of about 360°.

4. Fluid dosing valve assembly according to claim 1, wherein the fluid path consists of at least three linear segments.

5. Fluid dosing valve assembly according to claim 4, wherein the fluid path consists of four linear segments.

6. Fluid dosing valve assembly according to claim 1, wherein the valve assembly comprises a seal element contouring at least a portion of the length of the stem element.

7. Fluid dosing valve assembly according to claim 6, wherein the stem element comprises a coaxial duct, an inlet orifice and an outlet orifice, the fluid path being comprised of: an inlet duct in the valve body, an inlet opening in the seal element and an inlet orifice in the stem element, in alignment with each other in order to define an inlet line; a coaxial duct in the stem element, substantially perpendicular to the inlet line; an outlet orifice in the stem element, an outlet opening in the seal element and an outlet duct in the said valve body, in alignment with each other in order to define an outlet line that is substantially perpendicular to the coaxial duct; a dispensing duct in the valve body that is substantially perpendicular to the outlet line and incident to the outlet duct.

8. Fluid dosing valve assembly according to claim 7, wherein the inlet line and outlet line are positioned side by side.

9. Fluid dosing valve assembly according to claim 1, wherein the valve body comprises a main duct having a portion of enlarged diameter in proximity of a first end of the duct, thus forming a shoulder with the remaining portion, the seal element being designed to be fitted inside the main duct and comprising a first portion, substantially fitting the enlarged diameter portion of the main duct, and a second portion having an external diameter substantially equal to the inner diameter of the enlarged diameter portion of the main duct, but a lower length, so that the seal element does not extend to the opposite end of the main duct, the seal element also comprising a third portion of smaller diameter that protrudes from the first end of the main duct.

10. Fluid dosing valve assembly according to claim 1, wherein the stem element is operatively connected with motor means and is fitted for rotation inside a through hole of the seal element.

11. Fluid dosing valve assembly according to claim 6, the seal element being made of a material that avoids any leakage to occur and has a low friction coefficient.

12. Fluid dosing valve assembly according to claim 1, comprising plug means apt to close the open end of the coaxial duct of the stem element, the plug means comprising a spindle, apt to be inserted in the coaxial duct up to the level of the outlet orifice, without interfering with it, and an external body of larger diameter.

13. Fluid dosing valve assembly according to claim 12, wherein the external body protrudes from the open end of the main duct and has a diameter smaller than the internal diameter of the main duct, so that a gap is created.

14. Fluid dosing valve assembly according to claim 13, wherein, around the external body of the plug means, a ring is positioned which is in abutment with the head surface of the seal element, spring means also being positioned around the external body and protruding outside the main duct from one side while abutting against the ring at the other side.

15. Fluid dosing valve assembly according to claim 14, an axial retaining plate being removably fixed on the valve body, in abutment with the spring means, wherein the axial retaining plate comprises a recessed portion on the abutting surface, in which the projecting head of both the plug means and the spring means can be accommodated.

16. Fluid dosing valve assembly according to claim 15, wherein the said recessed portion of the axial retaining plate comprises a through hole that houses a bolt insisting coaxially against the external body of the plug means.

17. Fluid dosing valve assembly according to claim 9, wherein a radial retaining plate is removably fixed on the valve body at the opposite side of the main duct, with respect to the axial retaining plate, the surface of the radial retaining plate facing toward the valve body comprising a recessed portion that mates with the protruding third portion of the seal element.

18. Fluid dosing valve assembly according to claim 7, wherein the dispensing duct comprises dispensing means for dispensing said fluid.

19. Fluid dosing valve assembly according to claim 1, comprising connecting means that put into flow communication the valve body, through inlet means, with a fluid reservoir.

20. Fluid dosing valve assembly according to claim 19, comprising thermostatting means to keep the fluid at a constant temperature and pumping means to deliver the fluid at a given constant pressure.

\* \* \* \* \*